United States Patent [19]

Raidel, Sr.

[11] Patent Number: 4,690,427

[45] Date of Patent: Sep. 1, 1987

[54] FORK MOUNT MONO-WHEEL SUSPENSION

[76] Inventor: John E. Raidel, Sr., Rte. 1, Box 400-N, Springfield, Mo. 65804

[21] Appl. No.: 554,579

[22] Filed: Nov. 23, 1983

[51] Int. Cl.⁴ .............................................. B60G 3/00
[52] U.S. Cl. .................................... 280/694; 280/92; 280/277; 280/698; 280/699
[58] Field of Search .............. 280/693, 694, 698, 699, 280/702, 704, 710, 711, 712, 43, 92, 779, 780; 267/64.19; 280/277, 276, 275, 283, 285

[56] References Cited

U.S. PATENT DOCUMENTS

| | | | |
|---|---|---|---|
| 1,422,671 | 7/1922 | Cochran | 280/92 |
| 1,689,582 | 10/1928 | Duresen | 280/285 X |
| 1,946,948 | 2/1934 | Roos | 280/699 |
| 1,972,354 | 9/1934 | North et al. | 280/277 |
| 2,286,576 | 6/1942 | Ronning | 280/699 X |
| 3,434,707 | 3/1969 | Raidel | 280/712 X |
| 3,510,149 | 5/1970 | Raidel | 280/712 |
| 3,525,184 | 8/1970 | Harbers et al. | 280/6 R X |
| 3,612,572 | 10/1971 | Raidel | 280/710 |
| 3,746,363 | 7/1973 | Borns | 280/698 X |
| 3,801,086 | 4/1974 | Raidel | 280/713 X |
| 4,427,213 | 1/1984 | Raidel, Jr. | 280/711 |

FOREIGN PATENT DOCUMENTS

| | | | |
|---|---|---|---|
| 351908 | 4/1922 | Fed. Rep. of Germany | 280/283 |
| 454737 | 1/1928 | Fed. Rep. of Germany | 280/699 |
| 1032674 | 6/1958 | Fed. Rep. of Germany | 280/690 |
| 1385600 | 12/1964 | France | 280/699 |
| 166147 | 2/1959 | Sweden | 280/699 |

Primary Examiner—John J. Love
Assistant Examiner—Mitchell J. Hill
Attorney, Agent, or Firm—Rogers, Howell, Moore & Haferkamp

[57] ABSTRACT

A steerable fork mount that is pre-assembleable and compact comprising a fork having a top and two depending pedestals that are rigidly formed together, that are relatively short in the fore and aft direction, with a rocker beam at the bottom, rockable about a vertical stub shaft supported on each pedestal and providing an arrangement to support a spring mounted between the rocker beam and the pedestal, and with an arrangement to make the pedestal structure extremely rigid and strong, particularly in the transmission of the displacement forces from the wheel to the spindle mount.

6 Claims, 6 Drawing Figures

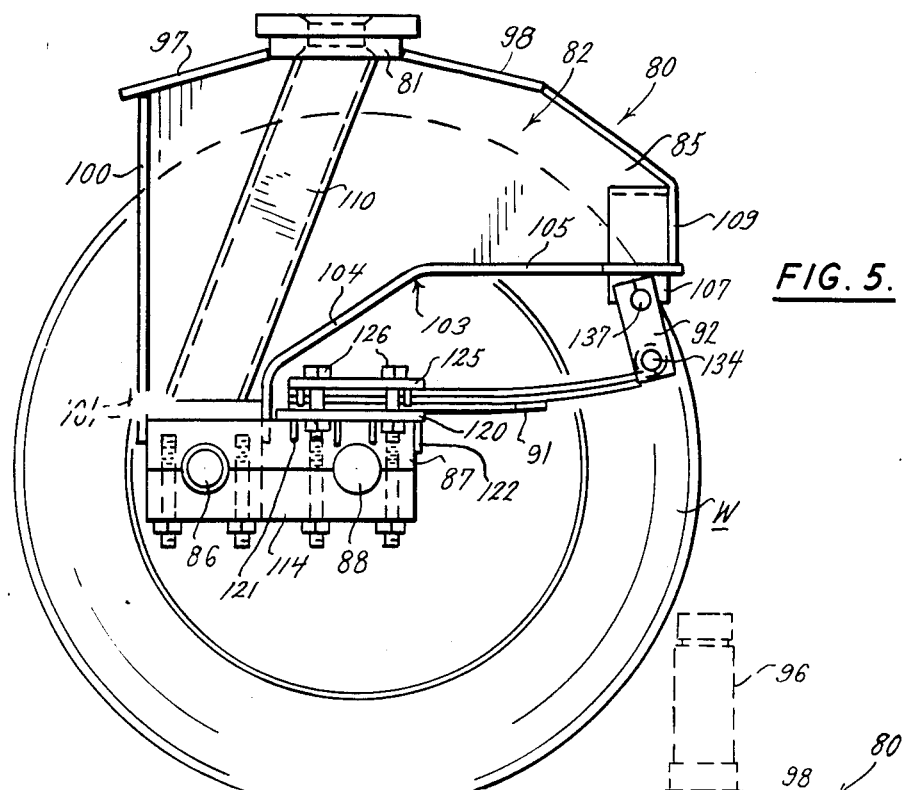
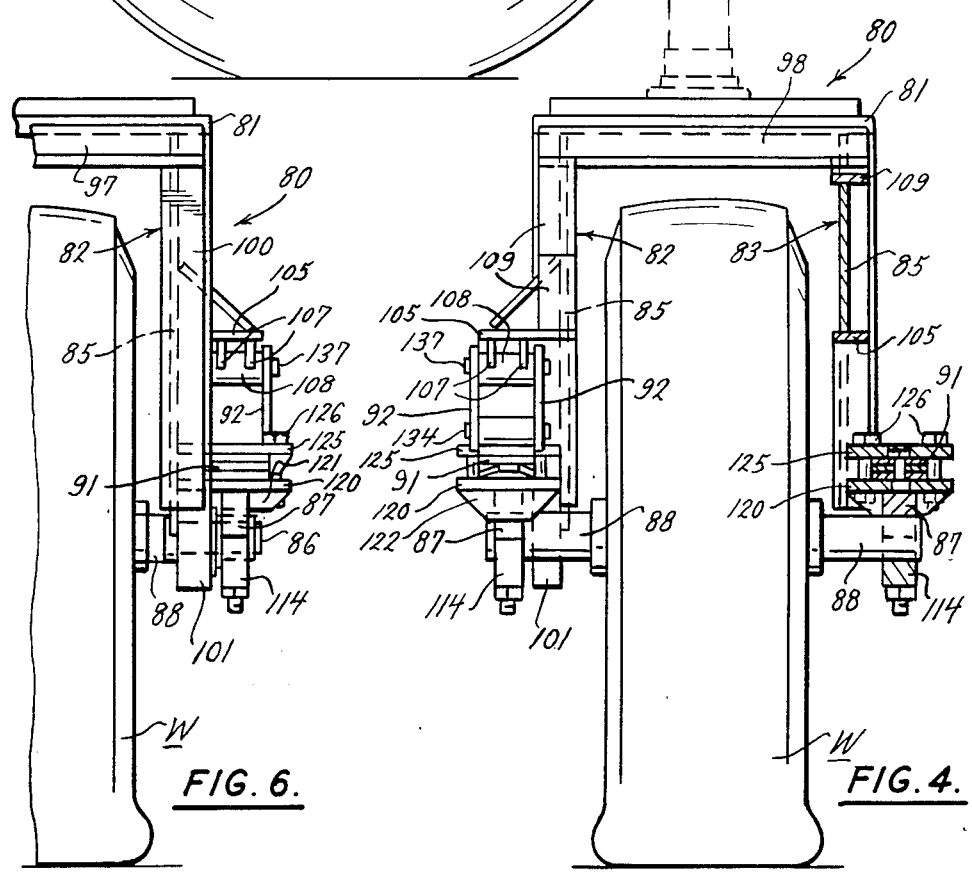

FORK MOUNT MONO-WHEEL SUSPENSION

SUMMARY OF THE DISCLOSURE

A steerable fork mount that is pre-assembleable and compact comprising a fork having a top and two depending pedestals that are rigidly joined together, that are relatively short in the fore and aft direction, each with a rocker beam at the bottom, rockable about a vertical stub shaft supported on each pedestal, and providing a means to support a spring mounted between the rocker beam and the pedestal, and with means to make the pedestal structure extremely rigid and strong, particularly in the transmission of the displacement forces from the wheel to the spindle mount.

BACKGROUND OF THE INVENTION

The invention basically uses a three point rocker system somewhat like that shown in the Raidel U.S. Pat. Nos. 3,434,707, 3,510,149 and 3,612,572, although much simplified. It avoids the requirement of having a double spring arrangement as shown in the '707 patent and thus is enabled to be both shorter and otherwise more compact. It also is pre-assembleable because it mounts the rocker beam directly onto the pedestal on one end and to the spring at the other end. Also it consists of essentially two fork arms, each comprising a pedestal, a rocker arm, a means to receive the wheel bearing shaft and a spring with sometimes a shock absorber, all supported on the single pedestal.

It also provides a means to transmit the forces applied vertically to the rocker beam shaft through a rigid channel member directly upwardly to the spindle thus increasing the rigidity of the structure.

It likewise provides an arrangement of this same kind that can be used with either leaf springs or with air springs.

IN THE DRAWINGS

FIG. 4 is an end view from the rear of the fork assembly mount using a leaf spring;

FIG. 5 is a side elevation taken from the left side of FIG. 4; and

FIG. 6 is a half front end view taken of the left side of FIG. 4.

The present invention comprises a fork mount monowheel which can be steered and which has spring action. The fork mount is generally indicated at 10, and has a top cross member 11 spanning between two depending side members generally indicated at 12 and 13. As will appear, a wheel W is supported on the fork mount and is disposed between the members 12 and 13.

Figure 2:
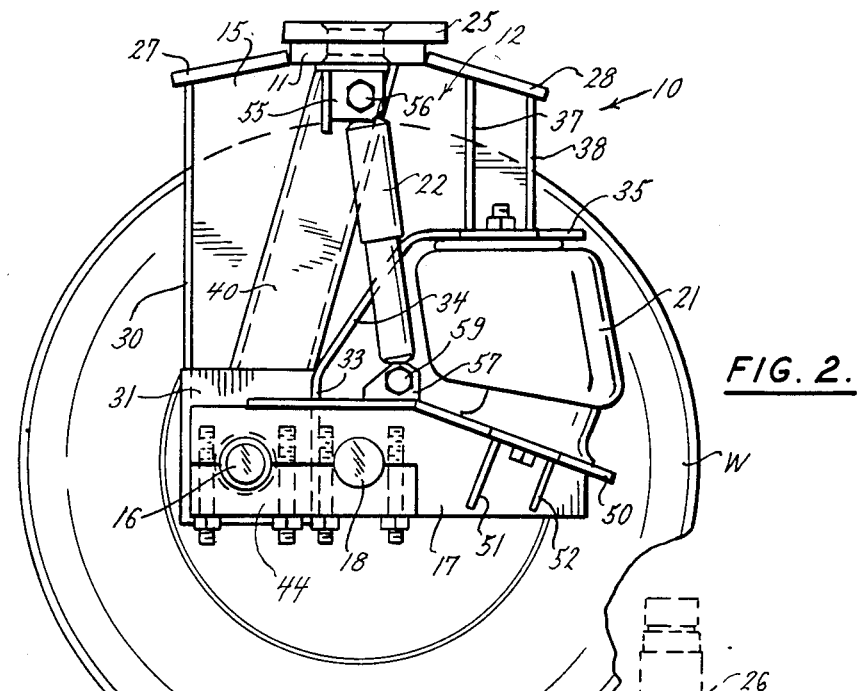
FIG. 2 is a side elevation of the left side in FIG. 1.
Figures 1, 3:
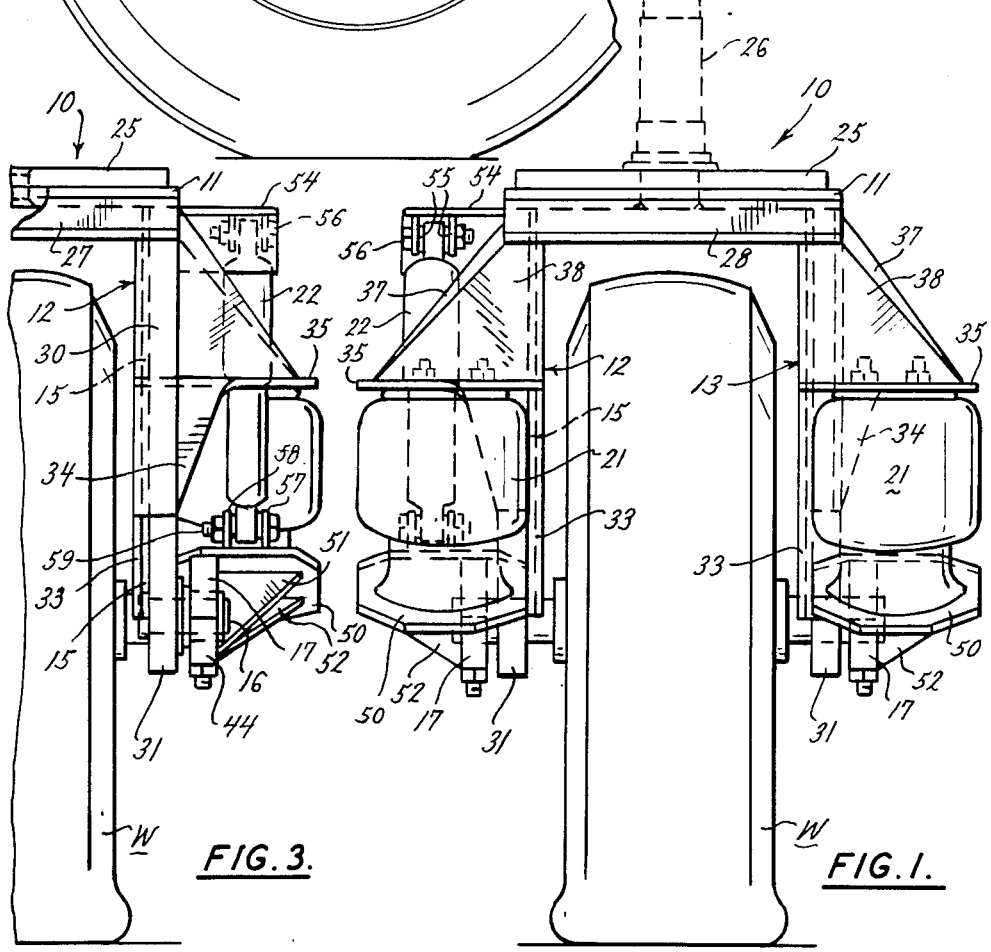
FIG. 1 is an end view from the rear of the fork mount monowheel assembly with air springs.
FIG. 3 is a half view from the front of the left side of the mount.

A description of one of the side members can suffice for both of them, as they are mirror images of each other; and any differences will be noted. Accordingly, a side member which is shown in FIGS. 1 and 2 will be specifically described. It comprises essentially a vertical plate 15 that forms a pedestal for a beam pivot 16 upon which a rocker beam 17 is mounted. The rocker beam 17 in turn supports the main axle 18 of the wheel W. To the rear of the axle 18 and mounted on the beam 17 there is an air spring 21, the upper end of which is secured to the pedestal 15. As also will appear, there is a shock absorber 22 mounted between the pedestal 15 and the rocker beam 17.

In greater detail, the plate 15 has at its top a transverse block 25 to which a steering spindle 26 may be mounted to support the entire fork mount assembly on the vehicle itself. The spindle 26 is vertically aligned with the axis of axle 18. From the block 25 two top plates 27 and 28 extend fore and aft, respectively, spanning between the two side members 12 and 13. The forward vertical edge of the plate 15 receives a flange 30 connected to the roof panel 27 and extending downwardly to be joined to a lower block 31. The rear edge of the block 31 receives the lowermost vertical portion 33 of a flange that extends upwardly, outwardly and backwardly as at 34 to join a bordering horizontal portion 35. At the rear the plate 15 and the horizontal portion 35 are braced by two vertical gussets 37 and 38 that extend downwardly and outwardly from below the back roof panel 28 to the outwardly projecting portion of the horizontal plate 35. All of the foregoing parts of the pedestal assembly 15 are made of steel and are welded together.

Also, a channel 40 is welded to the outside of the pedestal plate 15, sloping downwardly and forwardly in the direction from the middle of the block 25 to the top of the block 31, this arrangement being such as to transmit the load applied to the fork pivot stub axle 16 up to the vertical spindle 26. This channel is welded to the block 25, to the plate 15, and to the block 31.

The beam 17 is provided with two semi-cylindrical recesses to receive the two shafts 16 and 18. A bearing block 44 with complementarily shaped recesses is bolted onto the beam 17. An appropriate sleeve bearing is provided for the shaft 16.

The beam 17 has a plate 50 on its top portion. This plate constitutes a support for the bottom section of the air spring 21. It is reinforced by two gusset plates 51 and 52. As noted, the air spring is bolted to the plate 50. The upper section of the air spring (which can be of the type disclosed in U.S. Pat. No. 3,434,707) is mounted to the underside of the plate 35 of the pedestal assembly.

A shock absorber 22 is secured on only one side of the fork mount 10. For this purpose a mounting member 54 extends outwardly (FIG. 3) from below the block 25 and has two ears 55 depending therefrom to support the top mounting 56 of the shock absorber 22 and to provide limited pivotal movement thereof. The other end of the shock absorber is mounted on two ears 57 and 58 projecting upwardly from the top of the plate 50 of the beam 17 to receive the mounting 59 for the lower portion of the shock absorber to provide limited pivotal movement thereof.

The second embodiment of the present invention shown in FIGS. 4–6 is basically the same as that of FIGS. 1–3, except that it uses leaf springs instead of the air springs of FIGS. 1–3. The fork is generally indicated at 80 and has a top cross member 81 spanning between two depending side members generally indicated at 82 and 83. The wheel W is supported on the fork mount and is disposed between the members 82 and 83.

A description of one of the side members can suffice for both as they are mirror images of each other, save only for the fact that the shock absorber is on only one side as will be noted. Each comprises essentially a vertical plate 85 that forms the pedestal mount for the beam pivot shaft 86 upon which a rocker beam 87 is mounted. The rocker beam 87 in turn supports the main axle 88 of the wheel W. Mounted on the beam 87 is one end of a set of leaf springs 91, the other end of which is secured through a shackle 92 to the pedestal 85.

In greater detail, the block 81 that connects the two sides 82 and 83 receives the steering spindle 96 for supporting the entire fork mount assembly on the vehicle. The spindle 96 is vertically aligned with the axis of the axle 88. From the block 81 two top plates 97 and 98 also span between the side members 82 and 83, aiding in making the fork rigid.

The forward vertical edge of each pedestal plate 85 receives a flange 100 that extends vertically downwardly along the front edge of the plate to a block 101. The back edge of the block 101 receives the lowermost vertical portion of a flange 103 that extends upwardly, outwardly and backwardly as at 104 to join a widening horizontal portion 105. At the rear of the wider portion of this horizontal section two vertical ears 107 extend downwardly as part of the shackle and hold a bearing sleeve 108. At the rear edge of the panel 85 a flange 109 extends upwardly and forwardly to the rear edge of the top panel 98. Also a channel 110 is welded to the outside of the pedestal plate 85, sloping downwardly and forwardly in the direction from the spindle at the middle of the block 95 to the top of the block 101, the arrangement being such as to transmit the load applied to the fork pivot stub axle 86 up to the vertical spindle 96. All of the foregoing parts of the pedestal are made of steel and are welded together.

The beam 87 is provided with two semi-cylindrical recesses to support the two shafts 86 and 88. A bearing block 114 with complementarily shaped recesses is bolted onto the beam 87. An appropriate sleeve bearing is provided for the shaft 86.

In this embodiment the leaf spring 91 is mounted on the top of the rocker beam 87. To this end there is a plate 120 mounted on the top of the rear of the rocker beam 87, extending outwardly therefrom and reinforced by gusset plates. These are shown as three smaller gusset plates 121, and a larger gusset plate 122 extending across the end of the beam.

The base end of the leaf spring is mounted on the top of the plate 120 as illustrated. A plate 125 and bolts 126 are used to clamp and secure the spring between the plates 120 and 125. Guides in the form of pins or bolts keep the leaves of the spring from moving laterally, as do the guides 126.

The spring 91 extends rearwardly to the lower end of the shackle 92, and has its long leaf rolled around the lower pivot 134 of the shackle for limited swivel movement thereon. The upper end of the shackle has both of its two lateral members 92 attached to the opposite ends of a pin 137 which is mounted in the sleeve 108 that is welded to the depending ears 107 on the plate.

The operation of this suspension will first be described in connection with the air spring embodiment. Assuming that the fork mount mono-wheel is to be used as the steering front wheel of a machine such as a sweeper, it will be mounted into the vehicle with a spindle 26 rotatably supported on the vehicle with means to turn it for steering.

Prior to mounting it, the various components can all be assembled, even including the wheel. With the blocks 44 of the beams 17 removed, the stub shafts 16 will be mounted in the blocks 31. The wheel axle 18 can then be placed in the cylindrical cutouts provided for it in the beams 17 on each side, and the blocks 44 bolted in place, thus securing the wheel to the beams and the beams to the pedestals 15. The air springs 21 are bolted in position between the plates 35 of the pedestals and the plates 50 of the beams 17. The shock absorber is put on the one side of the fork mount with the pivots 56 and 59 as indicated. The appropriate control, as needed, may be provided to supply the proper amount of air to the air springs. Such means are known in the art as indicated in the U.S. Pat. No. 3,434,707.

Then to mount the fork assembly into the vehicle it is necessary only to insert the spindle into the appropriate portion of the vehicle of itself.

If the vehicle goes over a sudden rise in the surface, the wheel will be pushed upwardly relative to the fork. In this, the beams 17 are rocked about the shafts 16 and the lower members of the air springs 21 are moved upwardly within the upper members, increasing the pressure of the air in those springs. Conversely, if the wheel drops into a depression, the air spring permits such by the withdrawal of the lower portions with respect to the upper portions, but the shock absorber 22 cushions the action.

The forces applied by the wheel to the structure are thus transmitted to points between the front to rear extremes of the pedestals. Since the upward forces applied through the stub shafts 16 to the pedestals are directly applied to them, the air pressure in the air springs is designed, along with the leverage involved, to cause the beams 17 primarily to rock in a direction to move the lower ends of the air springs upwardly. Conversely, the wheel can drop more readily because of the yielding of the air spring.

It will also be noted that the force transmitted to the pedestals by the shafts 16 can be delivered almost directly to the spindle 16 because of the position and shape of the channels 40. The forces transmitted through the air spring are accepted by the plates 33–35 including their gussets 37 and 38, the plate 15 and the top member 28 to the spindle area.

The operation of the leaf spring embodiment is substantially the same except for the difference required by the leaf springs. The pre-assembly of the parts is the same so that the fork mount can be pre-assembled with the wheel for mounting on the vehicle. In this case, if the wheel goes over a sudden elevation, it will move the beams 87, rocking them about the shafts 86 against the resistance of the leaf springs. This action is enabled by the shackle-mounting of the springs. Such upward forces were transmitted to two points into each pedestal, namely, at the front stub axles 86 and at the upper end of the shackles. On the other hand, if the wheel drops into a depression, this too will cause a deformation of the leaf springs and the forces downwardly of the wheel will be transmitted through the shafts 86 and the shackles to the pedestals. Also, the channels 110 transmit the forces directed upwardly by the stub shafts 86 directly to the transverse top block 81, giving much greater rigidity in that area. Of course, the forces are in part transmitted through the entire pedestal structure. Conversely, if the wheel drops down and the vehicle comes down on top of it, those forces will be transmitted through the pedestals and the channels to the shafts 86 and through the springs to the wheel.

Thus in the case of either the air spring arrangement or the leaf spring arrangement, there is a compact pre-assembleable fork mount for a monowheel support that requires a minimum of assembling onto the vehicle. It provides for a ready means to replace the front wheel or its tire. Further, the replacement of the tire and wheel without replacing the entire fork is also very simple, requiring only that the blocks 44 or 114 be removed and the wheel repaired or a spare wheel installed with the replacement of the blocks.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What I claim is:

1. In a wheel mount particularly adapted to a single wheel mounted on an axle; the combination of a fork mount having a transverse block at its upper end, means on the top of the block to mount the wheel mount for turning movement on an axis, and two depending side members secured to the block, one for the left side and one for the right side of the wheel; each side member comprising a plate forming a pedestal extending fore and aft with respect to the wheel with its forward edge being rearward of the front part of the wheel, left and right rocker beams extending fore and aft with respect to and on opposite sides of the wheel; connecting means including left and right pivot shafts for rockably connecting the left and right rocker beams, respectively, to the lower parts of the left and right pedestal plates, the forward edges of the pedestal plates being substantially coterminous with the forward ends of the rocker beams and having reinforcing flanges thereon; each rocker beam having means to the rear of the pivot shaft to connect the same to the wheel axle and also having a rear end extending rearward of the wheel axle; each pedestal plate having a spring attachment means spaced above said rear end of the rocker beam to form an upward and backward space, and a spring means mounted between the rear ends of each left and right rocker beam and the respective spring attachment means on each left and right pedestal plates.

2. The wheel mount of claim 1 wherein each pedestal plate has a transverse flange bordering its lower edge.

3. The combination of claim 1 wherein there are flanges on each of the the pedestal plates, one extending from the forward edge down to adjacent said forward end of the rocker beam, the other extending upwardly and backwardly along the edge of the pedestal plate, to overlie the spring means.

4. In a fork mount of claim 1, each side member comprising a plate of sheet steel, the plates being substantially vertical with respect to the wheel, means connecting the side members across the top fore and aft of the block, the side members at their forward ends extending downwardly to where they are connected to the forward ends of rocker beams the rim of the said member being cut away upwardly and backwardly at the lower edge to provide a space for the spring means between the rear end of the rocker beams and the pedestal plates, with the spring means disposed within the space provided between the rear ends of rocker beams and the pedestal plates.

5. In the wheel mount of claim 4, a sheet metal channel member welded to each of the two side members and extending from adjacent the top of said member at the axis to adjacent the lower part thereof at the rocker beam connection.

6. In the structure of claim 1, the spring means on each side comprising a leaf spring having its forward end mounted upon the rocker beam adjacent the wheel axle and extending rearwardly therefrom, and a shackle between it and the pedestal plate above it, the shackle being disposed rearwardly of the axle by at least approximately the amount of space between the axle and the forward connection of the rocker beam to the pedestal plate.

* * * * *